United States Patent [19]

Nakagawa et al.

[11] Patent Number: 4,501,140
[45] Date of Patent: Feb. 26, 1985

[54] FUEL INJECTION RATE DEDUCING SYSTEM FOR A DIESEL ENGINE

[75] Inventors: Toyoaki Nakagawa, Yokosuka; Masao Nakajima, Atsugi; Yoshihisa Kawamura; Nobukazu Kanesaki, both of Yokosuka, all of Japan

[73] Assignee: Nissan Motor Company, Limited, Japan

[21] Appl. No.: 428,221

[22] Filed: Sep. 29, 1982

[30] Foreign Application Priority Data

Nov. 20, 1981 [JP] Japan .................. 56-186497

[51] Int. Cl.³ .......................................... F02M 59/00
[52] U.S. Cl. ..................... 73/119 A; 73/113
[58] Field of Search ............. 73/119 A, 114, 113, 73/861.05; 137/338

[56] References Cited

U.S. PATENT DOCUMENTS

| | | | |
|---|---|---|---|
| 3,739,761 | 6/1973 | Niles | 73/113 X |
| 3,973,536 | 10/1976 | Zelders | 73/113 X |
| 4,220,045 | 2/1980 | Suzuki | 73/861.05 |
| 4,338,816 | 7/1982 | Neff | 73/119 A |
| 4,377,149 | 3/1983 | Naylor et al. | 123/557 |
| 4,381,748 | 5/1983 | Eckert | 73/116 X |
| 4,385,867 | 5/1983 | Straubel | 73/119 A X |

FOREIGN PATENT DOCUMENTS

| | | | |
|---|---|---|---|
| 50032 | 4/1982 | European Pat. Off. | 123/510 |
| 2386692 | 11/1978 | France . | |
| 2456223 | 12/1980 | France | 123/514 |
| 2490733 | 3/1982 | France . | |
| 0012008 | 1/1979 | Japan | 73/862.18 |
| 46010 | 3/1980 | Japan | 123/510 |
| 2031994 | 4/1980 | United Kingdom | 123/511 |
| 1575643 | 9/1980 | United Kingdom | 123/514 |
| 2053354 | 2/1981 | United Kingdom . | |

Primary Examiner—John W. Caldwell, Sr.
Assistant Examiner—Ellwood G. Harding, Jr.
Attorney, Agent, or Firm—Lowe, King, Price & Becker

[57] ABSTRACT

A fuel injection rate deducing system for a diesel engine includes a fuel injection pump and a fuel feed pump. The injection pump has an inlet, an outlet, and an overflow outlet. The outlet is connected to the engine to conduct fuel from the injection pump to the engine to effect fuel injection. The overflow outlet is internally connected to the inlet. A fuel feed line is connected to the inlet to conduct fuel to the injection pump. The feed pump is disposed in the feed line to drive fuel into the injection pump via the feed line. A fuel return line connects the overflow outlet to the feed line at a position upstream of the feed pump. At least some of the fuel conducted to the injection pump via the inlet exits from the injection pump via the overflow outlet and then all enters the feed pump via the return line and the feed line. A flowmeter measures the rate of fuel flow through the feed line upstream of the connection of the return line to the feed line. The measured results are used to indicate the rate of fuel injection via the injection pump.

12 Claims, 14 Drawing Figures

FUEL INJECTION RATE DEDUCING SYSTEM FOR A DIESEL ENGINE

BACKGROUND OF THE INVENTION

This invention relates to a fuel injection rate deducing system for a diesel engine.

The rate of fuel injected into combustion chambers can be used as a reliable parameter for controlling, for example, exhaust gas recirculation in a diesel engine. A fuel injection pump driven by the engine supplies a controlled quantity of fuel to engine combustion chambers. Some fuel injection pumps have an accelerator lever to change the rate of fuel injection. In this case, the angular position of the accelerator lever and the rotational speed of the engine can be used to deduce the rate of fuel injection (see SAE 800167). However, such deduction is somewhat inaccurate, since the relationship between the angular position of the accelerator lever and the rate of fuel injection at a constant rotational speed of the engine varies with the temperature and the age of the fuel injection pump. On the other hand, it is generally difficult to directly measure the rate of fuel injection.

SUMMARY OF THE INVENTION

It is an object of this invention to provide an accurate fuel injection rate deducing system for a diesel engine.

In accordance with this invention, a fuel injection rate deducing system for a diesel engine includes a fuel injection pump and a fuel feed pump. The injection pump has an inlet, an outlet, and an overflow outlet. The outlet is connected to the engine to conduct fuel from the injection pump to the engine to effect fuel injection. The overflow outlet is internally connected to the inlet. A fuel feed line is connected to the inlet to conduct fuel to the injection pump. The feed pump is disposed in the feed line to drive fuel into the injection pump via the feed line. A fuel return line connects the overflow outlet to the feed line at a position upstream of the feed pump. At least some of the fuel conducted to the injection pump via the inlet exits from the injection pump via the overflow outlet and then all enters the feed pump through the return line and the feed line. A flowmeter measures the rate of fuel flow through the feed line upstream of the connection of the return line to the feed line. The measured results are used to indicate the rate of fuel injection via the injection pump.

The above and other objects, features and advantages of this invention will be apparent from the following description of preferred embodiments thereof, taken in conjunction with the drawings.

BRIEF DESCRIPTION OF THE DRAWINGS

Like reference characters denote like parts throughout the drawings.

DESCRIPTION OF THE PREFERRED EMBODIMENTS

Figure 1:
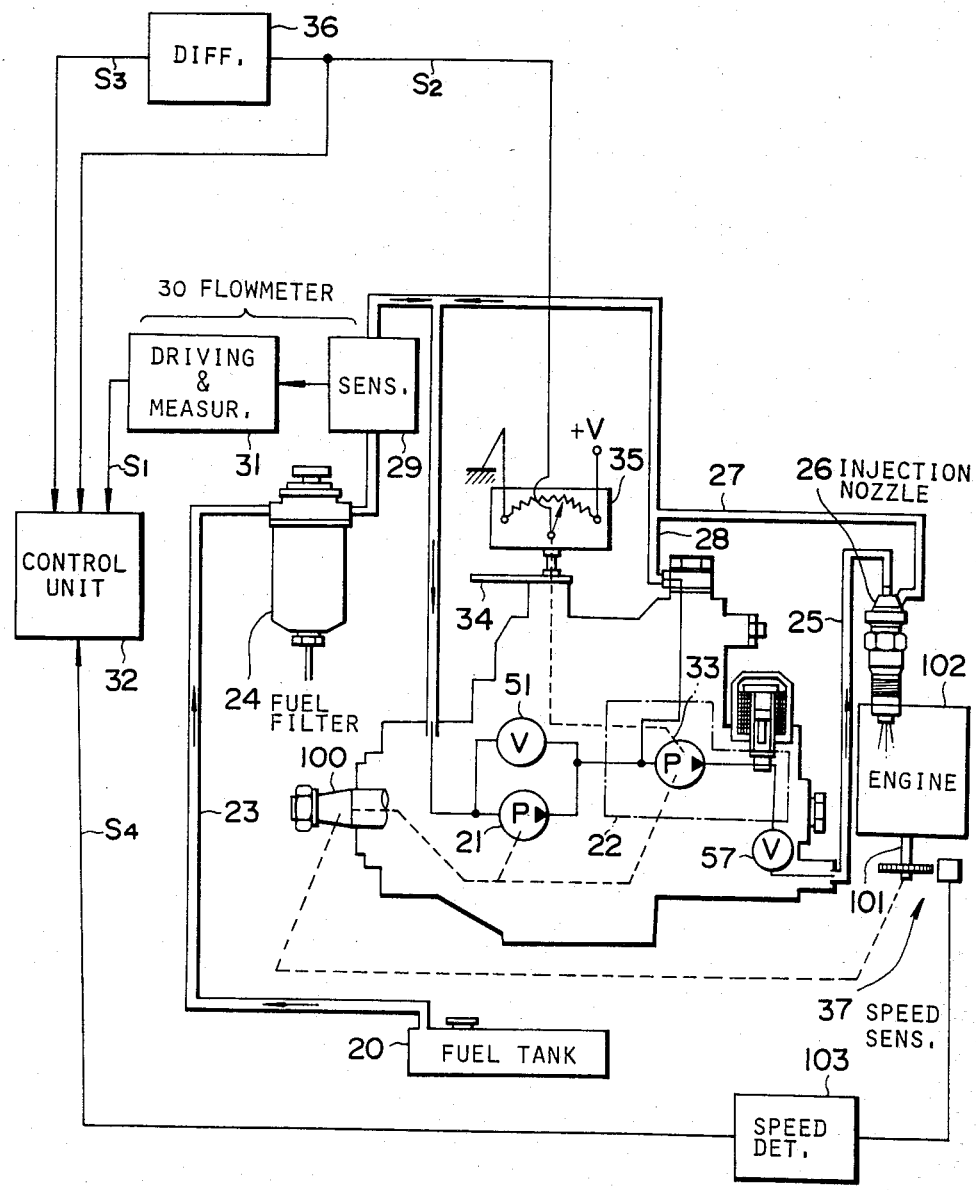
FIG. 1 is a schematic diagram of a fuel injection rate deducing system for a diesel engine according to a first embodiment of this invention.

With reference to FIG. 1, there is shown a diesel engine fuel supply system equipped with a fuel injection rate deducing system according to a first embodiment of this invention. The fuel supply system has a fuel tank 20, a fuel feed pump 21, and a fuel injection pump 22. The pumps 21 and 22 have a common drive shaft 100 and are disposed within a common housing. The drive shaft 100 is coupled to the crankshaft 101 of a diesel engine 102 so that the pumps 21 and 22 will be driven by the engine 102. The speed ratio of the coupling between the drive shaft 100 and the crankshaft 101 is chosen so that the drive shaft 100 will rotate at half the speed of the crankshaft 101. A fuel feed line 23 connects the tank 20 to the inlet of the injection pump 22. The feed pump 21 is disposed in the feed line 23 to draw fuel from the tank 20 and supply it to the injection pump 22. A pressure control valve 51 is connected across the feed pump 21 to control the pressure at the outlet of the feed pump 21. A fuel filter 24 is disposed in the feed line 23 upstream of the feed pump 21 to remove dirt and other contaminants from fuel drawn into the feed pump 21. A fuel delivery line 25 connects the outlet of the injection pump 22 to the inlet of a fuel injection nozzle 26 to conduct fuel from the injection pump 22 to the injection nozzle 26. The injection nozzle 26 discharges fuel into a combustion chamber within the engine 102. A check valve 57 is disposed in the fuel delivery line 25 in such a way as to prevent fuel flow back to the injection pump 22.

The injection nozzle 26 has a fuel return outlet. One end of a fuel return line 27 is connected to the fuel return outlet of the injection nozzle 26, and the other end thereof is connected to the feed line 23 upstream of the feed pump 21 but downstream of the filter 24. Some of the fuel conducted to the injection nozzle 26 returns to the feed pump 21 via the return line 27 and the feed line 23.

The drawings and the accompanying description have been simplified to include a single injection nozzle 26 and a single set of delivery and return lines 25 and 27. Although some systems will be precisely as described, most engines will include a plurality of parallel injection nozzles 26.

The injection pump 22 has a fuel overflow or circulation outlet connected to the inlet thereof. The return line 27 has a branch 28, the distal end of which is connected to the overflow outlet of the injection pump 22. Fuel is circulated at a considerable rate by the feed pump 21 through the inlet and overflow outlet of the injection pump 22, the branch 28, the return line 27, and the feed line 23, so as to cool the injection pump 22 and to expel bubbles and air from the injection pump 22.

The rate of fuel exit from the tank 20 via the feed line 23 is equal to that of fuel discharge or injection into the combustion chamber via the injection nozzle 26, provided that the pumps 21 and 22, or the engine, operate continuously under a constant condition. A sensing section 29 of a fuel flowmeter 30 is disposed in the feed line 23 downstream of the fuel filter 24 but upstream of the connection of the return line 27 to the feed line 23, since the rate of fuel flow through the feed line 23 at this point is equal to the rate of fuel injection during constant operation of the pumps 21 and 22, although the rate of fuel flow through the feed line 23 downstream of the connection is generally greater than the rate of fuel injection due to fuel return and recirculation.

A driving and measuring section 31 of the flowmeter 30 is electrically connected to the sensing section 29 thereof. The sections 29 and 31 cooperate to sense the rate of fuel flow through the feed line 23 and generate a signal $S_1$ indicative thereof. The fuel flow rate signal $S_1$ is transmitted from the driving and measuring section 31 to an engine control unit 32 as a parameter used in controlling, for example, an exhaust gas recirculation system.

The injection pump 22 forces fuel into the injection nozzle 26 intermittently at a frequency proportional to the rotational speed of the engine. Thus, fuel injection via the injection nozzle 26 is also effected intermittently. The injection pump 22 has a control device 33 for varying the amount of fuel injected into the combustion chamber during each injection stroke. An accelerator lever 34 is pivotably supported by the common housing of the pumps 21 and 22, and is connected in turn to the control device 33 to move the latter. The accelerator lever 34 is linked to an accelerator pedal in the case of a vehicle-driving engine. The amount of fuel injected during each injection stroke varies in accordance with the angular position of the accelerator lever 34.

A potentiometer 35 is mechanically connected to the accelerator lever 34 in such a way that the movable contact of the potentiometer will pivot with the accelerator lever 34. A predetermined voltage is applied across the potentiometer resistor, so that voltage between the potentiometer movable contact and one of the ends of the potentiometer resistor varies linearly with the angular position of the accelerator lever 34. The engine control unit 32 is electrically connected to the potentiometer 35 to receive the above voltage as a signal $S_2$ indicative of the angular position of the accelerator lever 34. Also a differentiator 36 is electrically connected to the potentiometer 35 for receiving and differentiating the accelerator position signal $S_2$. Thus, the differentiator 36 generates a voltage proportional to the angular velocity of the accelerator lever 34. The engine control unit 32 is connected to the differentiator 36 to receive a voltage signal $S_3$ indicative of the angular velocity of the accelerator lever 34.

An engine speed sensor 37 is associated with the crankshaft 101. The speed sensor 37 consists of a combination of a magnetic pickup and a toothed disk mounted on the crankshaft 101 and produces an alternating voltage whose frequency is proportional to the rotational speed of the crankshaft 101 and thus of the engine 102. The speed sensor 37 may be a well-known crank angle sensor. An engine speed detector 103 is electrically connected to the speed sensor 37 to receive the alternating voltage therefrom, and measures the frequency of the alternating voltage to determine the engine rotational speed and generates a signal $S_4$ indicative thereof in a well-known way. The speed detector 103 may be a frequency-measuring circuit. The engine control unit 32 is connected to the speed detector 103 to receive the engine speed signal $S_4$.

Figure 2:
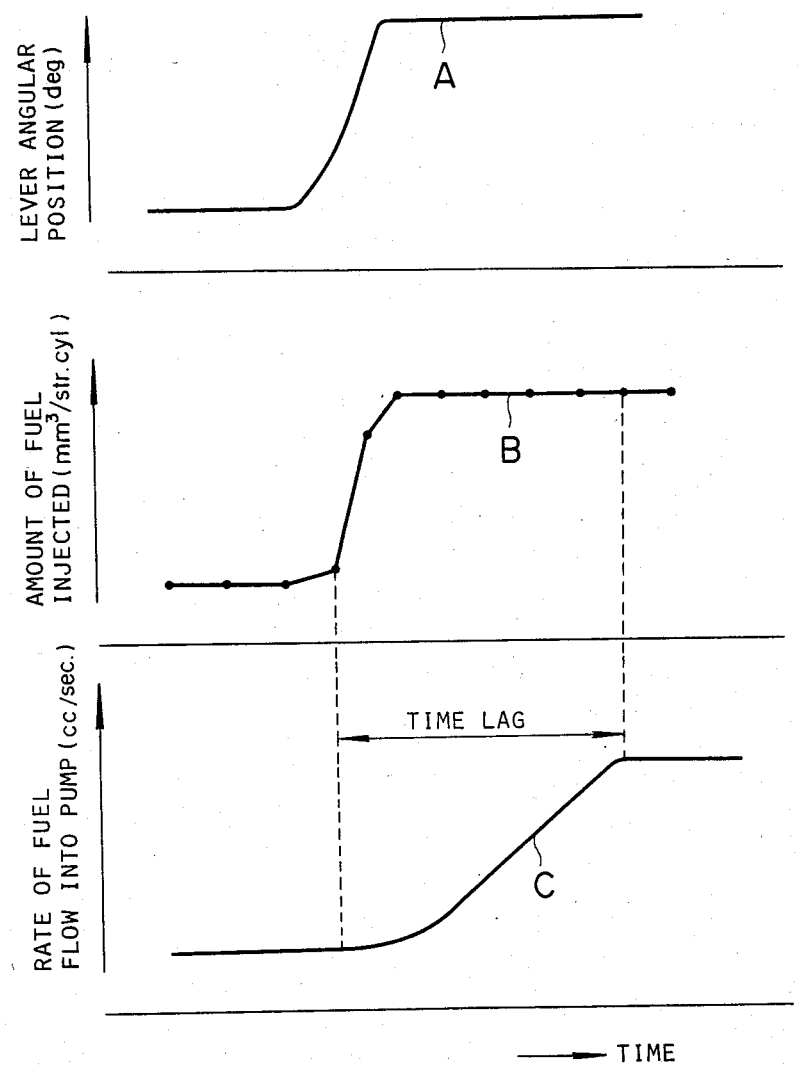
FIG. 2 is a timing chart relating angular position of an injection pump accelerator lever in FIG. 1, the amount of fuel injected via an injection pump in FIG. 1 during a single injection stroke, and the rate of fuel flow into the injection pump in FIG. 1, with time.

As the accelerator lever 34 is turned in the direction of increasing the amount of fuel injected as shown by the curve A in FIG. 2, the amount of fuel injected during each injection stroke increases with a small time lag with respect to the movement of the accelerator lever 34 as shown by the curve B in FIG. 2, whereas the rate of fuel flow into the feed pump 21 increases with a greater time lag with respect to the increase of the amount of fuel injected during each injection stroke as shown by the curve C in FIG. 2. Therefore, the accuracy of the fuel flow rate signal $S_1$ drops as an indication of the rate of fuel injection when the accelerator lever 34 is turned. The degree of decrease in the accuracy of the fuel flow rate signal $S_1$ generally increases with the angular velocity of the accelerator lever 34. Accordingly, the rate of fuel injection is essentially deduced from a calculation utilizing the accelerator lever position signal $S_2$ and the engine speed signal $S_4$ when the accelerator lever 34 is turned at greater than a preset velocity, although it is essentially deduced from the fuel flow rate signal $S_1$ at other times.

Figure 3:
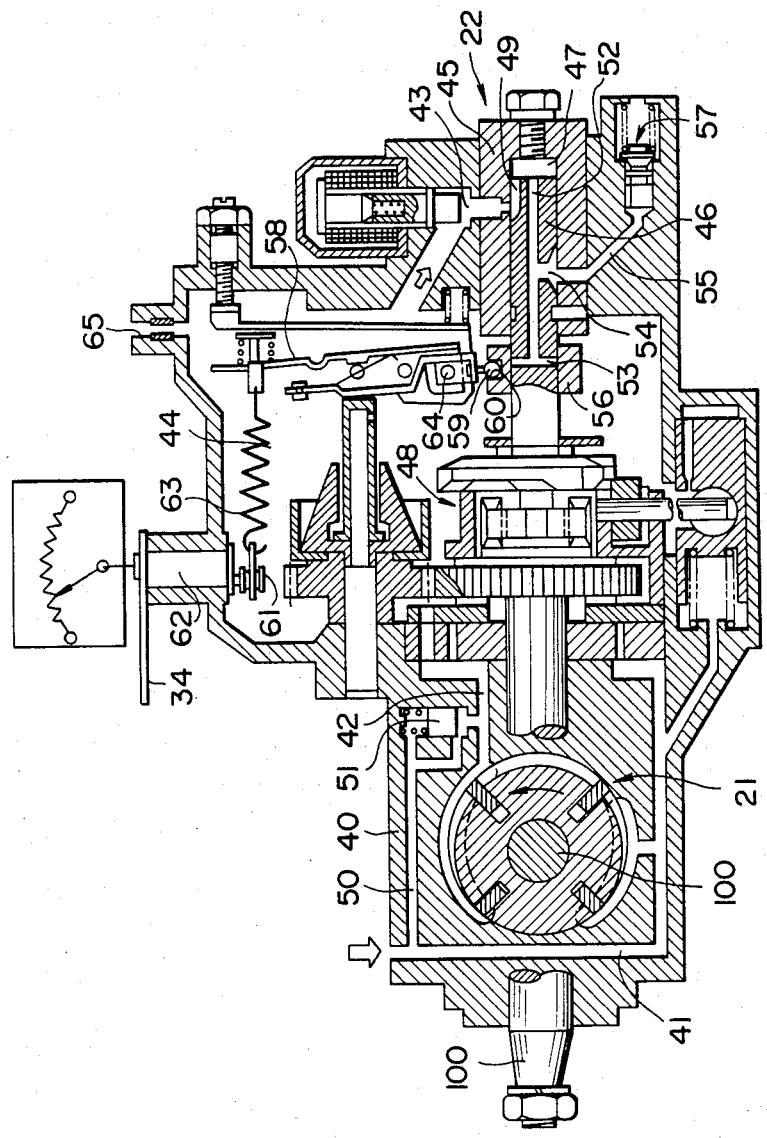
FIG. 3 is a cutaway view of the injection pump and a feed pump in FIG. 1.

FIG. 3 shows details of the pumps 21 and 22, which are conventional and, for example, essentially similar to those disclosed in U.S. Pat. No. 3,630,643 except for a drive mechanism for the control device 33. The pumps 21 and 22 are enclosed in a common housing 40, which has first, second, and third passages 41, 42, and 43, respectively, and a chamber 44. The first passage 41 extends from the outside of the housing to the inlet of the feed pump 21. The second passage 42 connects the outlet of the feed pump 21 with the chamber 44. The connection of the second passage 42 to the chamber 44 constitutes the inlet of the injection pump 22. The first and second passages 41 and 42 constitute part of the fuel feed line 23 downstream of the connection of the fuel return line 27 to the fuel feed line 23 (see FIG. 1). Fuel is drawn into the feed pump 21 via the first passae 41 and is then forced into the chamber 44 via the second passage 42.

The housing 40 has a fourth passage 50 connecting the first and second passages 41 and 42. A pressure control valve 51 is disposed in the fourth passage 50, and may return some of the fuel from the outlet to the inlet of the feed pump 21 to control the pressure in the outlet of the feed pump 21 and thus in the chamber 44. In this case, all of fuel passing through the fourth passage 50 is directed to the inlet of the feed pump 21. Note that the feed pump 21 is shown rotated through 90° for clarity in FIG. 3.

The fuel injection pump 22 has a cylinder 45 and a plunger 46 slideably disposed in the cylinder 45. The cylinder 45 and the plunger 46 define a working chamber 47 at the bottom of the cylinder 45. A combination key-engagement and cam 48 couples the plunger 46 and the drive shaft 100 in such a way that as the drive shaft 100 rotates, the plunger 46 rotates with the drive shaft 100 and reciprocates axially. The working chamber 47 expands and shrinks in accordance with axial movement of the plunger 46. The third passage 43 extends from the chamber 44 to the inside of the cylinder 45. An axial groove 49 formed in the plunger 46 selectively connects the working chamber 47 with the third passage 43 in accordance with rotation of the plunger 46. Fuel can be drawn from the chamber 44 into the working chamber 47 by expansion thereof through the third passage 43 and the axial groove 49. The plunger 46 has an axial passage 52 extending from the working chamber 47. The plunger 46 also has a diametrical passage 53 and a radial passage 54. The diametrical passage 53 connects the axial passage 52 with the chamber 44. The radial passage 54 selectively connects the axial passage 52 with a fifth passage 55 in the housing 40 in accordance with rotation of the plunger 46. The end of the fifth passage 55 adjacent to the plunger 46 constitutes the outlet of the injection pump 22. The fifth passage 55 constitutes part of the fuel delivery line 25, and is in turn connected to the fuel injection nozzle 26 (see FIG. 1). A control sleeve 56 is slideably mounted on the plunger 46. The openings of the diametrical passage 53 to the chamber 44 are selectively covered and uncovered by the control sleeve 56 in accordance with the axial displacement of the plunger 46 with respect thereto. During the portion of the compression stroke of the plunger 46 in which the openings of the diametrical passage 53 remain covered, fuel is forced out of the working chamber 47 and into the fifth passge 55 via the axial passage 52 and the radial passage 54 before being supplied to the injection nozzle 26. This is called the injection stroke of the injection pump 22. When the plunger 46 moves to a position in which the openings of the diametical passage 53 are uncovered, fuel is returned from the working chamber 47 to the chamber 44 via the axial passage 52 and the diametrical passage 53 so that fuel injection is interrupted or ended. The axial position of the control sleeve 56 determines the timing of exposure of the openings of the diametrical passage 53 and thus that of the end of fuel injection. Therefore, the axial position of the control sleeve 56 determines the amount of fuel injected during each injection stroke. The control sleeve 56 and the portion of the plunger 46 defining the diametrical passage 53 cooperate to constitute the control device 33. The check valve 57 is disposed within the fifth passage 55.

The lower end of an internal lever 58 engages the control sleeve 56 via a ball 59 received in a recess 60 in the control sleeve 56. The upper end of the internal lever 58 engages a pin 61 via a spring 63. The pin 61 is fixed eccentrically to the pivot shaft 62 of the accelerator lever 34. The internal lever 58 can pivot about an axle 64 between the lower and upper ends thereof. As the accelerator lever 34 pivots, the internal lever 58 also pivots so as to shift the control sleeve 56 axially. Thus, the amount of fuel injected during each injection stroke depends on the angular position of the accelerator lever 34. This exemplary structure operatively connecting the accelerator lever 34 to the control sleeve 56 is essentially similar to that disclosed in U.S. Pat. No. 4,253,438.

The housing 40 has an overflow outlet 65 passing through one wall thereof. The overflow outlet 65 extends from the chamber 44 to the outside of the housing 40. The chamber 44 communicates with the branch 28 (see FIG. 1) through the overflow outlet 65. A considerable amount of fuel flows into the branch 28 via the overflow outlet 65.

Figure 4:
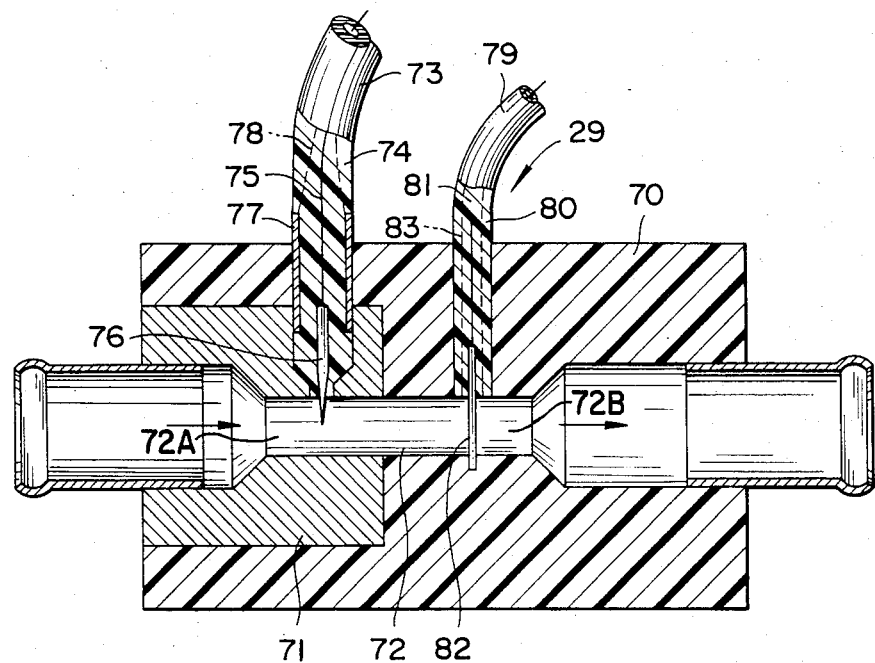
FIG. 4 is a sectional view of the sensing section of a flowmeter in FIG. 1 taken along the longitudinal axis thereof.
Figure 5:
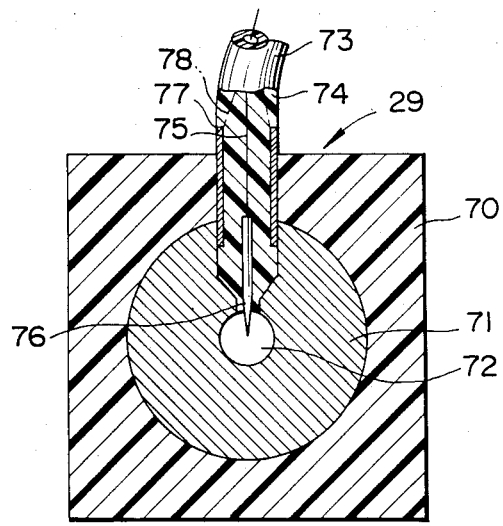
FIG. 5 is a cross-sectional view of the sensing section of FIG. 4 taken along a plane including a discharge electrode.

FIGS. 4 and 5 show details of the sensing section 29, which has a casing 70 made of insulating material. One end surface of the casing 70 is provided with a recess of circular cross-section in which a grounding electrode 71 of circular cross-section fits. A passage 72 is provided coaxially through the grounding electrode 71 and continues through the casing 70. The casing 70 is attached to the fuel feed line 23 in such a manner that the passage 72 constitutes part of the fuel feed line 23 and that a first segment of the passage 72 defined by the grounding electrode 71, is upstream of a second segment of the passage, shown at 72B and defined by the casing 70. The casing 70 and the grounding electrode 71 have a first hole which extends radially with respect to the passage segment 72A from the segment 72A to the outside of the casing 70. A first cable 73 fits into the first hole and extends outwardly from the casing 70. The first cable 73 includes an insulating cover 74 of circular cross-section and a wire 75 concentrically surrounded by the cover 74 and extending along the axis of the cover 74. The end of the first cable 73 has a coaxial needle discharge electrode 76 electrically connected to the wire 75. The discharge electrode 76 has a sharp conical tip which projects from the first cable 73 into the passage 72 in a radial direction with respect to the passage 72. The cover 74 insulates the discharge electrode 76 from the grounding electrode 71. A hollow cylindrical conductor 77 fits over the first cable 73 in the casing 70 to electrically connect the grounding electrode 71 to leads 78 extending axially through the first cable 73 and isolatedly from the wire 75. Voltage can be applied across or between the discharge electrode 76 and the grounding electrode 71 via the first cable 73, that is, the wire 75, the leads 78, and the cylindrical conductor 77.

The casing 70 has a second hole which extends radially with respect to the passage segment 72B from the segment 72B to the outside of the casing 70. A second cable 79 fits into the second hole and extends outwardly from the casing 70. The second cable 79 includes an insulating cover 80 of circular cross-section and a wire 81 concentrically surrounded by the cover 80 and extending along the axis of the cover 80. The end of the second cable 79 has a coaxially elongated capture or trap electrode 82 electrically connected to the wire 81. The capture electrode 82 extends from the second cable 79 perpendicularly across the segment 72B and into the casing 70 opposing the second cable 79 to be supported by the casing 70. The capture electrode 82 is positioned downstream of the discharge electrode 76 and the grounding electrode 71 and is isolated from them by the casing 70 and the cover 80. Leads 83 extend axially through the cover 80 starting from the passage segment 72B and are isolated from the wire 81.

When a high-voltage pulse is applied across or between the grounding electrode 71 and the discharge electrode 76 to cause a corona discharge in the passage segment 72A adjacent to the discharge electrode 76, a portion of fuel in the passage segment 72A adjacent to the discharge electrode 76 is ionized. When the ionized fuel reaches the capture electrode 82, a half-wave or bell-shaped voltage pulse is detected by the capture electrode 82. Therefore, the rate of fuel flow through the passage 72 can be determined by measuring the time interval between the high-voltage pulse and the peak of the bell-shaped pulse. The difference depends on the effective distance between the discharge electrode 76 and the capture electrode 82. In this case, the discharge electrode 76 and the capture electrode 82 offer relatively little resistance to the fuel flow through the passage 72 so as to have negligible effect on the working efficiency of the feed pump 21 (see FIGS. 1 and 3).

Figure 6:
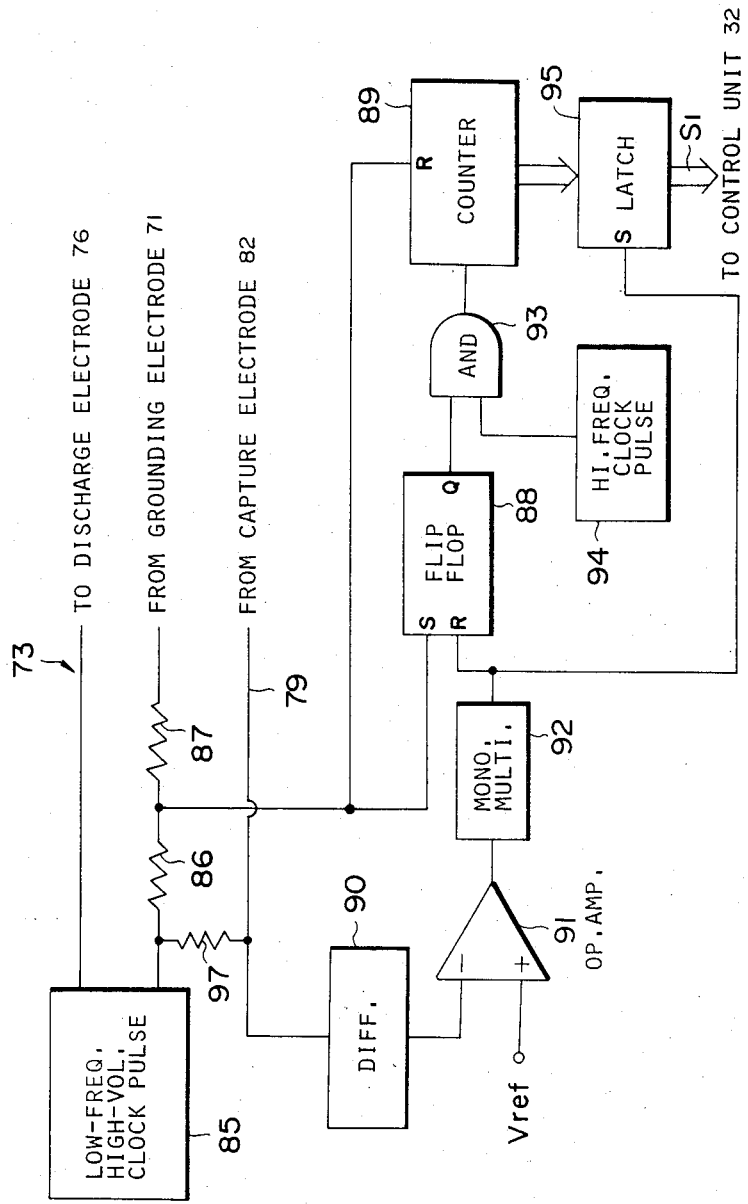
FIG. 6 is a schematic diagram of a driving and measuring section of the flowmeter in FIG. 1.

FIG. 6 shows details of the driving and measuring section 31, which includes a low-frequency high-voltage clock pulse generator 85. The positive output terminal of the generator 85 is connected via the first cable 73 to the discharge electrode 76 (see FIGS. 4 and 5). The negative or grounding output terminal of the generator 85 is connected via the cable 73 to the grounding electrode 71 (see FIGS. 4 and 5) through a series of combination of resistors 86 and 87. In this way, the high-voltage pulse output of the generator 85 is applied across or between the discharge electrode 76 and the grounding electrode 71. The negative or grounding output terminal of the generator 85 is also connected via the cable 79 to the capture electrode 82 (see FIG. 4) through a resistor 97.

The junction of the resistors 86 and 87 is connected to the set terminal of a flip-flop circuit 88 and the reset terminal of a counter 89. The combination of the resistors 86 and 87 serves to apply the pulsed output of the generator 85 at a reduced voltage to the flip-flop circuit 88 as a set pulse and to the counter 89 as a reset pulse.

The input terminal of a differentiator 90 is connected to the junction of the resistor 97 and the capture electrode 82 to receive and differentiate the bell-shaped pulse detected by the capture electrode 82 and developed across the resistor 97. The output terminal of the differentiator 90 is connected to the negative input terminal of an operational amplifier 91. The positive input terminal of the amplifier 91 is supplied with a reference voltage $V_{ref}$. The amplifier 91 serves as a comparator whose output is low when the output of the differentiator 90 exceeds the reference voltage $V_{ref}$ and is high at other times. The reference voltage $V_{ref}$ is chosen so that the output of the amplifier 91 goes from a low level to a high level when the bell-shaped pulse from the capture electrode 82 peaks, that is, when the output of the differentiator 90 changes from positive to negative. The input terminal of a monostable multivibrator 92 is connected to the output terminal of the amplifier 91. Triggered by a voltage change from a low level to a high level in the output of the amplifier 91, the multivibrator 92 produces a short pulse. Thus, the output pulses from the multivibrator 92 occur at almost the same time as the peaks of the bell-shaped pulses from the capture electrode 82.

The reset terminal of the flip-flop circuit 88 is connected to the output terminal of the multivibrator 92 to receive the output pulses therefrom as reset pulses. Since the flip-flop circuit 88 is set by a pulse from the generator 85 and reset by a pulse from the multivibrator 92, the output of the circuit 88 goes high when the output pulse of the generator 85 occurs and goes low when the bell-shaped pulse from the capture electrode 82 peaks. In this way, the flip-flop circuit 88 produces a pulse whose width indicates the time interval between the output pulse of the generator 85 and the peak of the bell-shaped pulse from the capture electrode 82.

One of two input terminals of an AND gate 93 is connected to the Q output terminal of the flip-flop circuit 88, and the other is connected to the output terminal of a high-frequency clock pulse generator 94. While receiving a pulse from the flip-flop circuit 88, the AND gate 93 opens and transmits pulses from the generator 94. The input terminal of the counter 89 is connected to the output terminal of the AND gate 93, so that the counter 89 receives and counts pulses from the generator 94 via the AND gate 93. The input terminal of a D-type flip-flop or latch circuit 95 is connected to the output terminal of the counter 89. The hold-control or strobe terminal of the latch circuit 95 is connected to the output terminal of the multivibrator 92, so that the latch circuit 95 holds the output number of the counter 89 when the bell-shaped pulse from the capture electrode 82 peaks. Since the counter 89 is reset when the pulse output of the generator 85 occurs, the number held by the latch circuit 95 is equal to the number of pulses transmitted from the generator 94 to the counter 89 during the pulse from the flip-flop circuit 88. Thus, the number held by the latch circuit 95 corresponds to the time interval between the pulse of the generator 85 and the peak of the pulse from the capture electrode 82, and is outputted by the latch circuit 95 in the form of a signal $S_1$ indicative of the time interval, that is, the rate of fuel flow in the feed line 23 at the sensing section 29.

Figure 7:
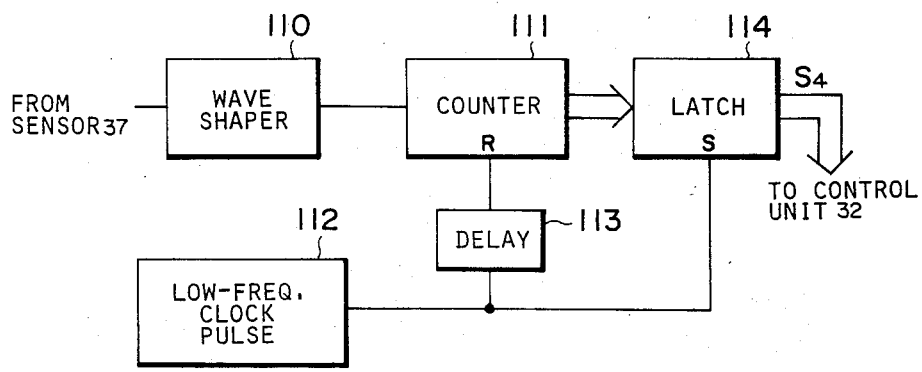
FIG. 7 is a block diagram of an engine speed detector in FIG. 1.

FIG. 7 shows details of the engine speed detector 103, which includes a wave shaper 110. The input terminal of the wave shaper 110 is connected to the output terminal of the speed sensor 37 (see FIG. 1). The wave shaper 110 transforms the alternating voltage from the speed sensor 37 into a corresponding rectangular pulse train with a frequency equal to that of the alternating voltage. The input terminal of a counter 111 is connected to the wave shaper 110, and the reset terminal thereof is connected to the output terminal of a low-frequency clock pulse generator 112 through a delay circuit 113. The input terminal of a D-type flip flop or latch circuit 114 is connected to the output terminal of the counter 111, and the hold-control or strobe terminal thereof is connected to the output terminal of the clock 112. The output of the counter 111 immediately before the counter 111 is reset is equal to the number of pulses from the wave shaper 110 received during a single period of the signal from the clock 112. The delay circuit 113 is chosen so that the latch circuit 114 holds the latest output of the counter 111 before the counter 111 is reset. Thus, the output of the latch circuit 114 indicates the frequency of the alternating voltage from the speed sensor 37, that is, the engine rotational speed, and is outputted as an engine speed signal $S_4$.

Figure 8:
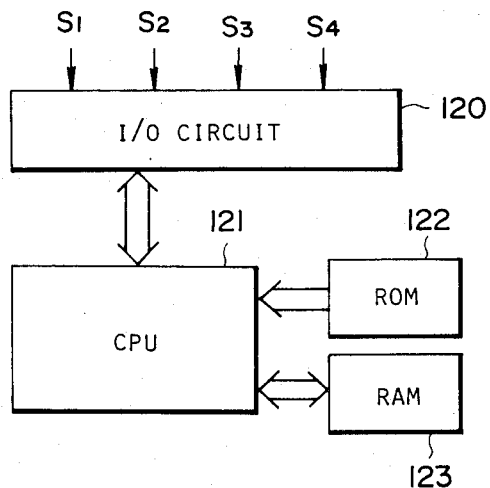
FIG. 8 is a block diagram of a control unit in FIG. 1.

FIG. 8 shows details of the engine control unit 32, which consists of a microcomputer system including an input/output circuit 120, a central processing unit 121, a program or read-only memory 122, and a read/write or random-access memory 123. The central processing unit 121 is connected to the input/output circuit 120, and memories 122 and 123. The input/output circuit 120 is connected to the driving and measuring section 29, the potentiometer 35, the differentiator 36, and the engine speed detector 103 to receive signals $S_1$, $S_2$, $S_3$, and $S_4$, respectively. The input/output circuit 120 includes analog-to-digital converters transforming the signals $S_2$ and $S_3$ into the corresponding digital forms. In accordance with a program stored in the memory 122, the central processing unit 121 functions to deduce the rate of fuel injection in response to the signals $S_1$, $S_2$, $S_3$ and $S_4$.

Figure 9:
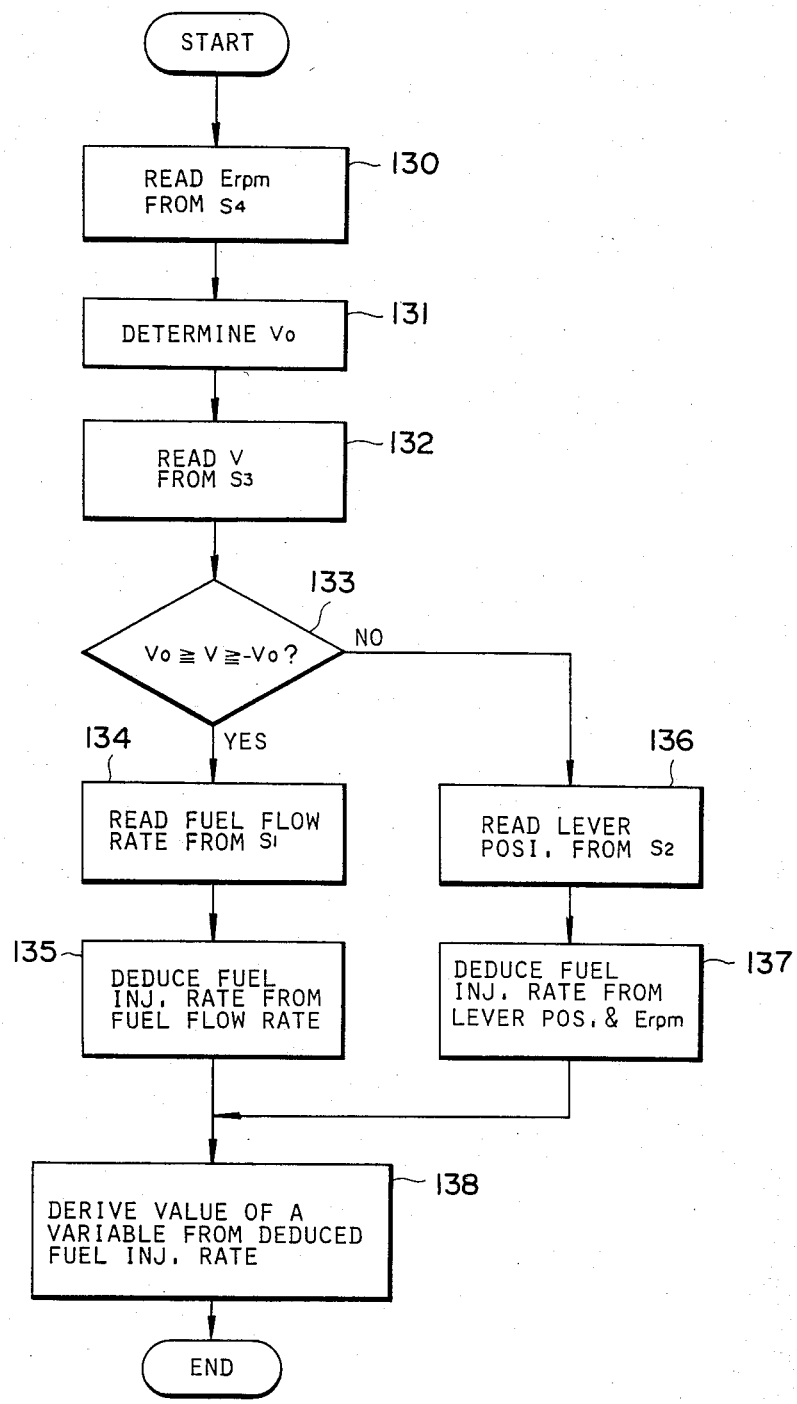
FIG. 9 is a flowchart of operation of the control unit in FIG. 8.

FIG. 9 shows a flowchart of operation of the central processing unit 121. In a first block 130, the unit 121 reads engine rotational speed Erpm from the signal $S_4$. Secondly, the unit 121 determines a reference positive value Vo by using a predetermined function with respect to engine speed Erpm in a block 131. The reference value Vo thus depends on engine speed Erpm. Thirdly the unit 121 reads the voltage V of the signal $S_3$ in a block 132. In a subsequent block 133, the unit 121 judges whether or not the voltage V is within a range from $-Vo$ to $+Vo$, where Vo is the reference value. The value Vo may alternatively be a constant independent of engine speed Erpm.

If the answer to the question in the block 133 is yes, that is, if the accelerator lever 34 (see FIG. 1) is held constant or turned at a relatively low velocity, the operation of the unit 121 proceeds to a block 134 in which the unit 121 reads the rate of fuel flow through the feed line 23 as indicated by the signal $S_1$. In a subsequent block 135, the unit 121 deduces or estimates the rate of fuel injection in response to the rate of fuel flow through the feed line 23, for example, by setting the rate of fuel injection equal to the rate of fuel flow through the feed line 23.

If the answer at the block 133 is no, that is, if the accelerator lever 34 is turned at a relatively high velocity, the operation of the unit 121 proceeds to a block 136 in which the unit 121 reads the angular position of the accelerator lever 34 from the signal $S_2$. In a subsequent block 137, the unit 121 deduces or estimates the rate of fuel injection according to the angular position of the accelerator lever 34 and engine speed Erpm, for example, from a table in which a set of experimentally determined values of the rate of fuel injection are stored as a function of engine speed Erpm and angular position of the accelerator level 34. The table is provided in the memory 122. In this way, the blocks 136 and 137 perform a function to compensate for the response lag of the flowmeter 30 when the accelerator lever 34 is turned rapidly.

After the blocks 135 and 137, the operation of the unit 121 proceeds to a block 138 in which the unit 121 decides, in accordance with the newly determined rate of fuel injection, the value of a control variable, for example, the rate of exhaust gas recirculation. Note that the unit 121 periodically repeats the operation of the blocks 130 to 138.

Figure 10:
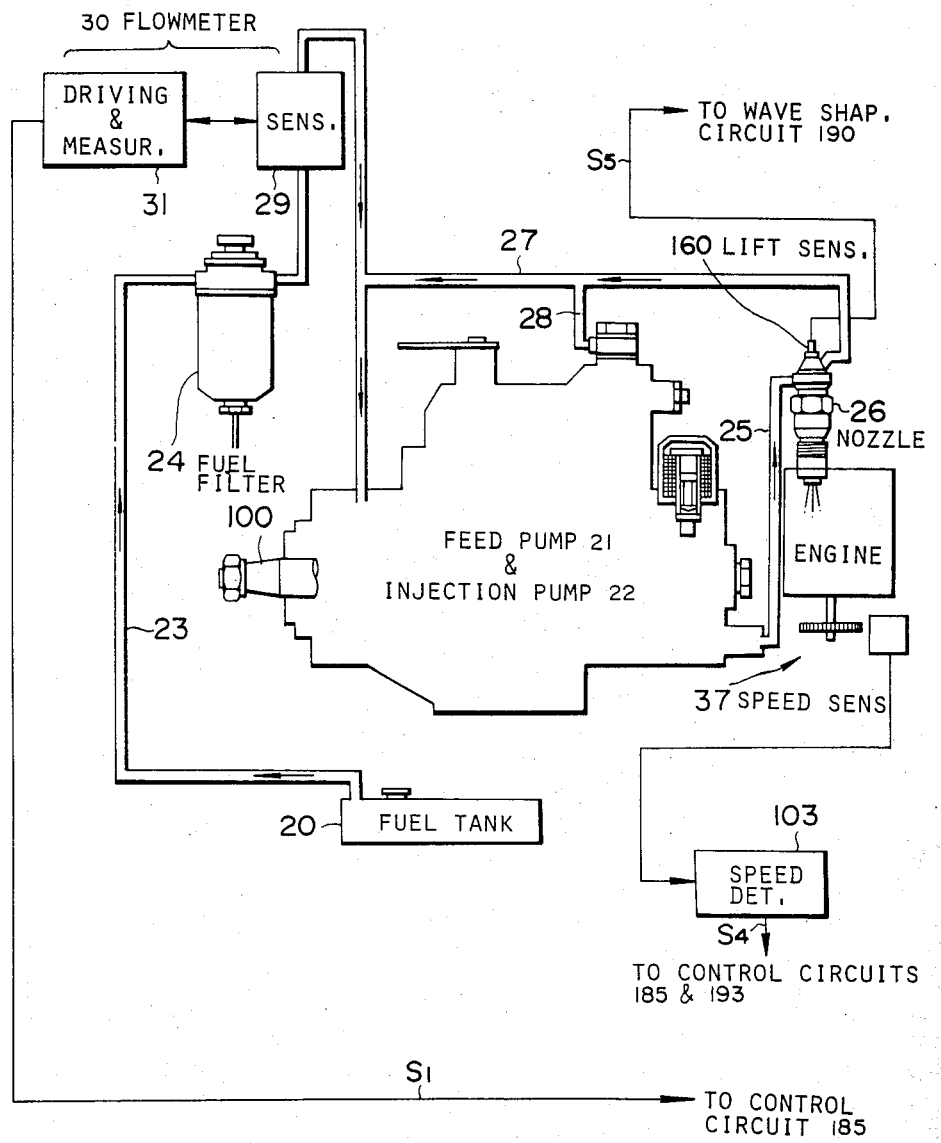
FIGS. 10 and 11 are schematic diagrams of a second embodiment of this invention.
Figure 11:
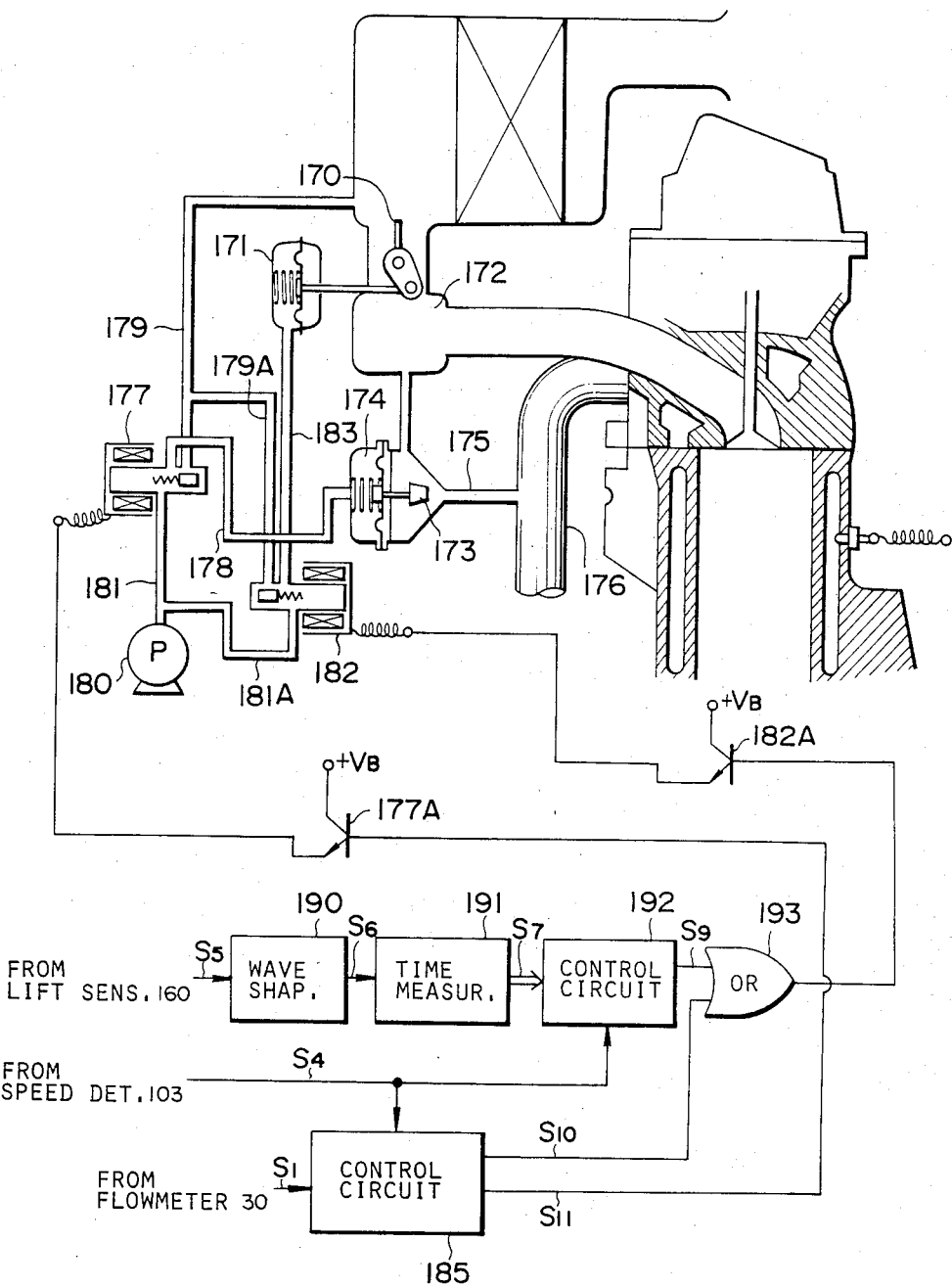

FIGS. 10 and 11 show a second embodiment of this invention, which includes an exhaust gas recirculation (EGR) system. The EGR system includes an intake air throttle valve 170, which controllably throttles an engine air intake passage 172 in accordance with a controlled vacuum pressure applied to an associated vacuum actuator 171. When a second vacuum actuator 174 is supplied with vacuum, an EGR valve 173 opens an EGR passage 175 to return a portion of the exhaust gas from an engine exhaust passage 176 to the air intake passage 172 downstream of the throttle valve 170.

When the throttle valve 170 is fully open, vacuum developed downstream of the valve 170 is weak so that the rate of EGR is small. As the throttle valve 170 closes, the vacuum increases so that the rate of EGR also increases in accordance with the effective difference between the vacuum and the exhaust gas pressure.

A three-way electromagnetic valve 177 is provided to control the vacuum supplied to the EGR actuator 174. A passage 178 connects the electromagnetic valve 177 to the actuator 174. A passage 179 connects the electromagnetic valve 177 to the air intake passage 172 upstream of the throttle valve 170. When energized, the electromagnetic valve 177 connects the passage 178 to the passage 179 to close the EGR valve 173. A passage 181 connects the electromagnetic valve 177 to a vacuum pump 180. When de-energized, the electromagnetic valve 177 connects the passage 178 to the passage 181 to supply vacuum to the actuator 174 to open the EGR valve 173.

A second three-way electromagnetic valve 182 is provided to control the vacuum supplied to the actuator 171. A passage 179A connects the electromagnetic valve 182 to the passage 179. A passage 183 connects the electromagnetic valve 182 to the actuator 171. A passage 181A connects the electromagnetic valve 182 to the vacuum pump 180. When energized, the electromagnetic valve 182 connects the passage 183 to the passage 179A to fully open the throttle valve 170. When de-energized, the electromagnetic valve 182 connects the passage 183 to the passage 181A to supply vacuum to the actuator 171 to close the throttle valve 170.

An EGR control circuit 185 made up of a programmable microcomputer system receives a signal $S_1$, indicative of the rate of fuel flow through a feed line 23, from a driving and measuring section 31 of a fuel flowmeter 30, an engine speed signal $S_4$ from an engine speed detector 103, and other signals indicative of other engine conditions, such as engine coolant temperature. The control circuit 185 outputs control signals $S_{10}$ and $S_{11}$ to effect optimal EGR in response to engine conditions.

The control signal $S_{10}$ is transmitted via an OR gate 193 (hereinafter described) to a switching transistor 182A, which is disposed in the electrical power supply line leading to the electromagnetic valve 182 to control energization and de-energization of the electromagnetic valve 182. When the control signal $S_{10}$ is at a high level, the transistor 182A is conductive to energize the electromagnetic valve 182. When the control signal $S_{10}$ is at a low level, the transistor 182A is unconductive to de-energize the electromagnetic valve 182. The control signal $S_{11}$ is fed to a switching transistor 177A, which is disposed in the electrical power supply line leading to the electromagnetic valve 177 to control energization and de-energization of the electromagnetic valve 177. When the control signal $S_{11}$ is at a high level, the transistor 177A is conductive to energize the electromagnetic valve 177. When the control signal $S_{11}$ is at a low level, the transistor 177A is unconductive to de-energize the electromagnetic valve 177.

Figure 12:
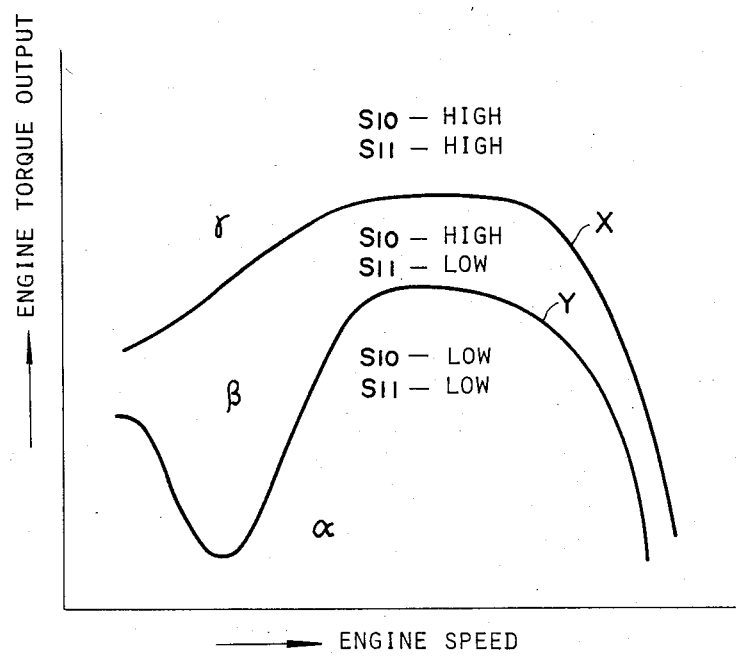
FIG. 12 is a graph of the states of signals $S_{10}$ and $S_{11}$, outputted by a control circuit in FIG. 11, as a function of engine torque output and engine rotational speed.

As shown in FIG. 12, the control signals $S_{10}$ and $S_{11}$ are responsive to engine rotational speed and engine torque output, that is, the rate of fuel injection. In a heavy engine load region $\gamma$ above the curve X, both the control signals $S_{10}$ and $S_{11}$ are high, fully opening the throttle valve 170 and closing the EGR valve 173 to interrupt EGR in order to prevent deterioration of engine power output. In a moderate engine load region $\beta$ between the curves X and Y, the control signal $S_{10}$ is high and the control signal $S_{11}$ is low, fully opening the throttle valve 170 and opening the EGR valve 173 to effect moderate EGR in order to reduce harmful emissions of $NO_x$. In a light engine load region $\alpha$ below the curve Y, both the control signals $S_{10}$ and $S_{11}$ are low, closing the throttle valve 170 and opening the EGR valve 173 to effect heavy EGR in order to adequately reduce $NO_x$ emissions.

Figure 13:
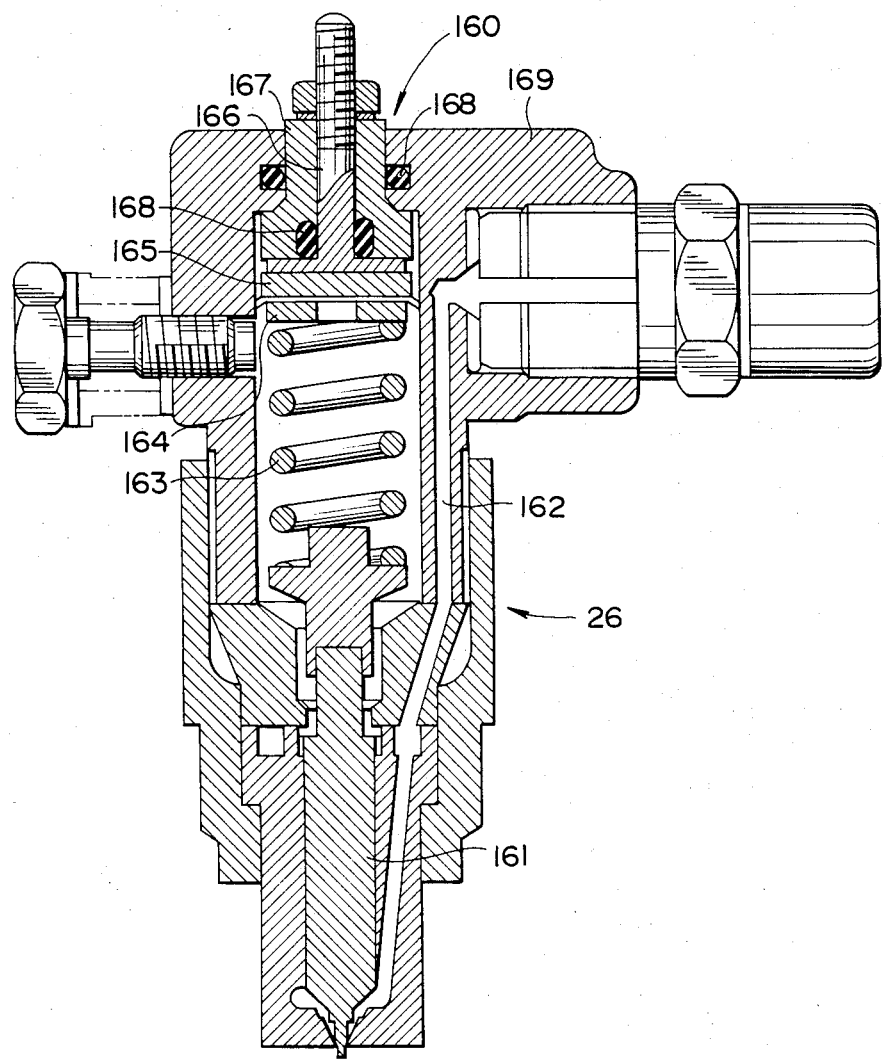
FIG. 13 is a longitudinal section view of a lift sensor and a fuel injection nozzle in FIG. 10.

A lift sensor 160 is attached to a fuel injection nozzle 26 to monitor operation thereof. As shown in FIG. 13, the injection nozzle 26 has a valve needle 161, which is lifted against a spring 163 when pressurized fuel is supplied via a fuel passage 162. A piezoelectric element 165 is sandwiched between a grounding plate 164 and an electrode 166. The spring 163 urges the grounding plate 164 toward the piezoelectric element 165. An insulating member 167 surrounds the electrode 166 to electrically isolate the electrode 166 from the body 169 of the injection nozzle 26. Sealing rings 168 are provided between the electrode 166 and the insulating member 167 and between the insulating member 167 and the body 169 to prevent fuel leakage.

Figure 14:
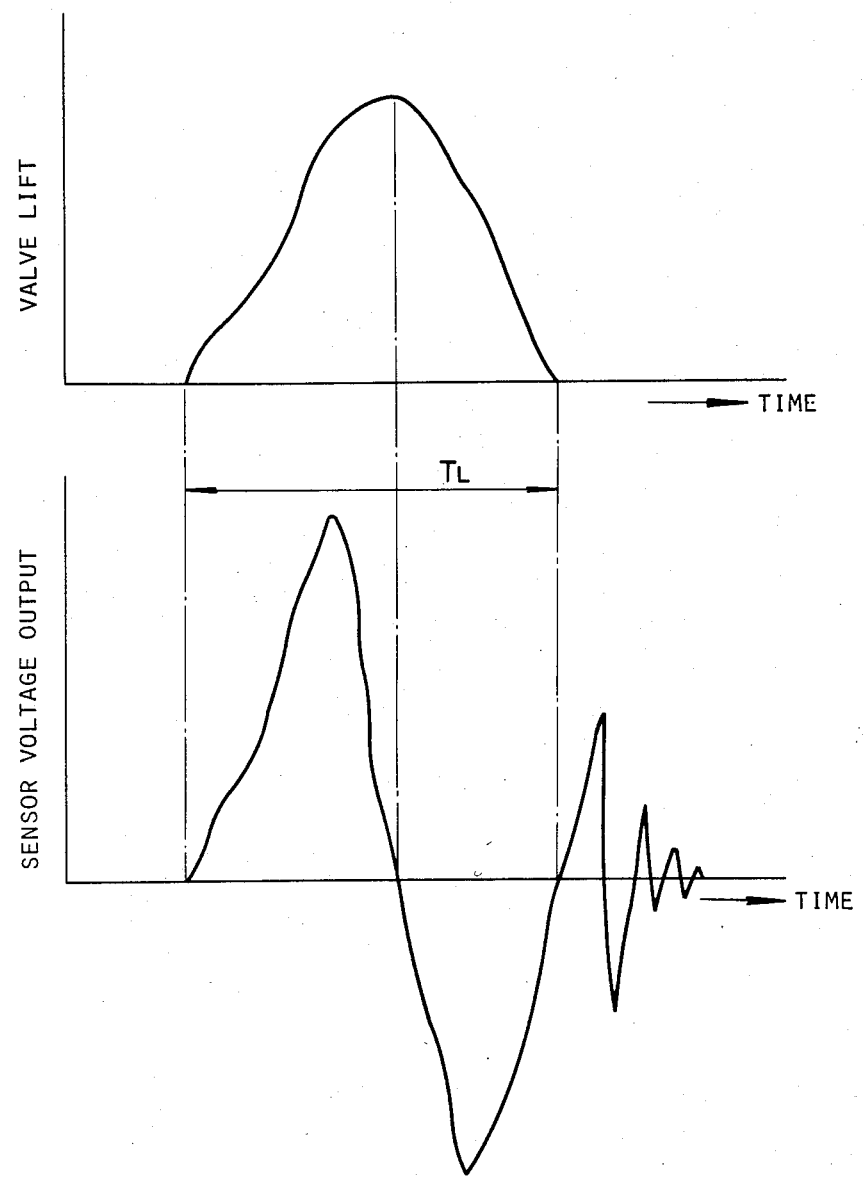
FIG. 14 is an exemplary timing chart of the output of the lift sensor in FIGS. 10 and 13, and lift of an injection nozzle valve needle in FIG. 13.

As the valve needle 161 is moved up and down to allow and interrupt fuel injection, force exerted on the piezoelectric element 165 by the spring 163 varies and the piezoelectric element 165 produces an alternating electromotive force reflecting the mechanic force. The resulting voltage is outputted via the electrode 166, and via the grounding member 164 and the body 169 as an output $S_5$ of the sensor 160. As shown in FIG. 14, the resulting or output voltage is positive while the valve needle 161 is rising and is negative while the valve needle 161 is dropping, thereby forming a large oscillation during the lift of the valve needle 161. When the valve needle 161 returns to its rest position, the resulting output voltage returns to its initial value after some brief and small oscillations. The lift period $T_L$ of the valve needle 161 can be derived by measuring the period of the largest oscillation in the sensor output $S_5$. Since the rate of fuel injection depends on the lift period $T_L$ of the valve needle 161, the resulting output voltage indicates the rate of fuel injection.

Returning to FIGS. 10 and 11, a wave shaping circuit 190 transforms the output $S_5$ of the sensor 160 into a square-wave pulse signal $S_6$, the pulsewidth of which represents the lift period $T_L$ of the valve needle 161 (see FIGS. 13 and 14). A time measuring circuit 191 measures the pulsewidth of signal $S_6$, and produces a digital signal $S_7$ indicative thereof. A control circuit 192 preferably made up of a programmable microcomputer system produces a digital signal $S_9$ in response to the signals $S_4$ and $S_7$ from the engine speed detector 103 and the time measuring circuit 191 respectively. Specifically, the signal $S_9$ is high when engine speed is small but engine load is heavy and is low at other times. The signal $S_9$ is conducted via the OR circuit 193 to the transistor 182A.

When the rate of fuel injection increases rapidly as engine load increases, the signal $S_9$ from the control circuit 192 quickly goes high and changes the transistor 182A to a conductive condition even if the signal $S_{10}$ from the control circuit 185 is low. As a result, the throttle valve 170 is fully opened to prevent excessive EGR and insufficient supply of air to the engine. After engine speed increases adequately, the signal $S_9$ returns to a low level. Thus, optimal EGR is established even when the rate of fuel injection increases rapidly, although the accuracy of the relationship between the signal $S_1$ from the driving and measuring section 31 and the rate of fuel injection drops in this condition. In this way, OR gate 193 can be seen to perform a function analogous to that of the block 133 in FIG. 9, namely, to compensate for the response lag of the flowmeter 30 when the engine load changes abruptly.

It should be understood that further modifications and variations may be made in this invention without departing from the spirit and scope of this invention as set forth in the appended claims. For example, the lift sensor 160 of the second embodiment can be used instead of the potentiometer 35 in the first embodiment. Additionally, the flowmeter 30 may be of the other conventional types.

What is claimed is:

1. A fuel injection rate deducing system for a diesel engine, comprising:
    (a) a fuel injection pump having an inlet, an outlet, and an overflow outlet, the outlet being connected to the engine for conducting fuel from the injection pump to the engine to effect fuel injection, the overflow outlet being internally connected to the inlet;
    (b) a fuel feed line connected to the inlet of the injection pump for conducting fuel to the injection pump;
    (c) a fuel feed pump disposed in the feed line for driving fuel into the injection pump via the feed line;
    (d) a fuel return line connecting the overflow outlet of the injection pump to the feed line at a position upstream of the feed pump, whereby at least some of the fuel conducted to the injection pump via the inlet thereof exits from the injection pump via the overflow outlet thereof and then re-enters the feed pump via the return line and the feed line; and
    (e) means for measuring the rate of fuel flow through the feed line upstream of the connection of the return line to the feed line,
    wherein the injection pump is driven by the engine and has movable means for determining the rate of fuel injection in accordance with position of the movable means and wherein the measuring means generates a signal indicative of the rate of fuel flow through the feed line, and further comprising
    means for sensing the position of the movable means and generating a signal indicative thereof,
    means responsive to the movable means position signal for determining the velocity of movement of the movable means and generating a signal indicative thereof,
    means responsive to the movable means velocity signal for judging whether or not the velocity of movement of the movable means is within a preset range and generating a signal indicative thereof,
    means for sensing the rotational speed of the engine and generating a signal indicative thereof, and
    means responsive to the signal generated by the judging means, the movable means position signal, the fuel flow rate signal, and the engine speed signal for deducing the rate of fuel injection on the basis of the rate of fuel flow through the feed line when the velocity of movement of the movable means is within the preset range and deducing the rate of fuel injection on the basis of the position of the movable means and the rotational speed of the engine when the velocity of movement of the movable means is out of the preset range.

2. A fuel injection rate deducing system as recited in claim 1, wherein the preset range is defined by a pair of positive and negative levels, the absolute values of which are equal.

3. A fuel injection rate deducing system as recited in claim 1, wherein the preset range depends on the rotational speed of the engine.

4. A fuel injection rate deducing system as recited in claim 1, wherein the preset range is constant.

5. A fuel injection rate deducing system comprising:
    (a) a fuel injection pump having an inlet, an outlet, and an overflow outlet, the outlet being connected to the engine for conducting fuel from the injection pump to the engine to effect fuel injection, the overflow outlet being internally connected to the inlet;
(b) a fuel feed line connected to the inlet of the injection pump for conducting fuel to the injection pump;
(c) a fuel feed pump disposed in the feed line for driving fuel into the injection pump via the feed line;
(d) a fuel return line connecting the overflow outlet of the injection pump to the feed line at a position upstream of the feed pump, whereby at least some of the fuel conducted to the injection pump via the inlet thereof exits from the injection pump via the overflow outlet thereof and then re-enters the feed pump via the return line and the feed line;
means for measuring the rate of fuel flow through the feed line upstream of the connection of the return line to the feed line,
means for generating a first signal indicative of said rate of fuel flow through said feed line,
means for generating a second signal indicative of a position of an accelerator associated with said diesel engine,
means for generating a third signal indicative of a rate of change of said second signal,
means for generating a fourth signal indicative of engine speed, and
control means responsive to said first, second, third and fourth signals for deducing said fuel injection rate for said diesel engine.

6. A fuel injection rate deducing system as recited in claim 5 wherein said control means comprises
means for determining engine rotational speed from said fourth signal,
means for obtaining a threshold value as a function of the determined engine rotational speed,
means for determining whether said third signal is within a range defined by said threshold value,
means for deducing said fuel injection rate from said first signal if said third signal is within said range, and
means for deducing said fuel injection rate from said second signal and from said fourth signal if said third signal is not within said range.

7. A fuel injection rate deducing system as recited in claim 5 wherein said control means comprises
input/output means for receiving said first through fourth signals,
first memory means for storing programs and fixed data,
second memory means for storing variable data and values of said signal, and
programmed microprocessor means connected to said input/output means and to said first and second memory means,
said microprocessor means programmed to
determine engine rotational speed from said fourth signal,
obtain a threshold value as a function of the determined engine rotational speed,
determine whether said third signal is within a range defined by said threshold value,
deduce said fuel injection rate from said first signal if said third signal is within said range, and
deduce said fuel injection rate from said second signal and from said fourth signal if said third signal is not within said range.

8. A fuel injection rate deducing system as recited in claim 7 wherein said microprocessor means is further programmed to access a table stored in said first memory means for determining said fuel injection rate as a function of said engine speed and said accelerator position when said third signal is not within said range.

9. A fuel injection rate deducing system for a diesel engine, comprising:
(a) a fuel injection pump having an inlet, an outlet, and an overflow outlet, the outlet being connected to the engine for conducting fuel from the injection pump to the engine to effect fuel injection, the overflow outlet being internally connected to the inlet, the injection pump having movable means for adjusting the rate of fuel injection in accordance with position of the movable means;
(b) a fuel feed line connected to the inlet of the injection pump for conducting fuel to the injection pump;
(c) a fuel feed pump disposed in the feed line for driving fuel into the injection pump via the feed line;
(d) a fuel return line connecting the overflow outlet of the injection pump to the feed line at a position upstream of the feed pump, whereby at least some of the fuel conducted to the injection pump via the inlet thereof exits from the injection pump via the overflow outlet thereof and then re-enters the feed pump via the return line and the feed line;
(e) means for measuring the rate of fuel flow through the feed line upstream of the connection of the return line to the feed line and generating a signal indicative thereof;
(f) means for sensing rotational speed of the engine and generating a signal indicative thereof;
(g) means for sensing position of the movable means and generating a signal indicative thereof;
(h) means, responsive to the movable means position signal, for determining whether or not the velocity of change in position of the movable means is within a preset range corresponding to substantially constant operating conditions of the engine and generating a signal indicative thereof; and
(i) means, responsive to the signal from the determining means, for deducing the rate of fuel injection selectively on the basis of the measured fuel flow rate signal under substantially constant engine operating conditions and on the basis of the movable means position signal and the engine speed signal under other, substantially transitional, engine operating conditions.

10. A fuel injection rate deducing system for a diesel engine, comprising:
(a) a fuel feed line;
(b) means for transmitting fuel through the fuel feed line;
(c) a fuel injection pump having an inlet connected to the fuel feed line for receiving fuel and an outlet connected to the engine for injecting fuel into the engine, the fuel injection pump having movable means for adjusting the rate of fuel injection in accordance with a position of the movable means;
(d) a flow meter disposed in the fuel feed line for measuring the rate of fuel flow through the fuel feed line and generating a signal indicative thereof;
(e) a speed sensor for sensing rotational speed of the engine and generating a signal indicative thereof;

(f) a position sensor for sensing the position of the movable means and generating a signal indicative thereof;

(g) means for determining whether or not the engine is under transitional operating conditions and generating a signal indicative thereof; and (h) means, responsive to the signal from the determining means, for deducing the rate of fuel injection selectively on the basis of the measured fuel flow rate signal when the engine is not under transitional operating conditions and on the basis of the engine speed signal and the movable means position signal when the engine is under transitional operating conditions.

11. A fuel injection rate deducing system as recited in claim 10, wherein the determining means includes:

(a) means, responsive to the movable means position signal, for determining velocity of change in position of the movable means and generating a signal indicative thereof; and (b) means, responsive to the movable means velocity signal, for determining whether or not the velocity of the movable means is within a preset range corresponding to substantially constant engine operating conditions.

12. A fuel injection rate deducing system as recited in claim 10 wherein said means for determining comprises means for determining a velocity of movement of said movable means, and programmed computer means for comparing said velocity with a predetermined threshold and for deducing fuel injection rate from said flow meter signal when said velocity of movement of said movable means is below said threshold, and for deducing said fuel injection rate from said movable means position sensor signal and from said engine speed sensor signal when said velocity of movement of said movable means is above said threshold.

* * * * *